United States Patent [19]

Woolley

[11] Patent Number: 4,565,265
[45] Date of Patent: Jan. 21, 1986

[54] HYDRAULIC PARKING BRAKE

[75] Inventor: James M. Woolley, Dayton, Ohio

[73] Assignee: General Motors Corporation, Detroit, Mich.

[21] Appl. No.: 695,198

[22] Filed: Jan. 25, 1985

[51] Int. Cl.$^4$ .................. F16D 55/26; B60T 11/00
[52] U.S. Cl. .................. 188/72.6; 188/72.8; 188/106 F; 188/370
[58] Field of Search .................. 188/72.6, 72.4, 72.5, 188/72.8, 72.9, 71.1, 370, 196 A, 353, 72.1, 106 F, 106 P; 92/62, 63, 66; 60/566, 579, 581, 593

[56] References Cited

U.S. PATENT DOCUMENTS

| | | | |
|---|---|---|---|
| 3,576,236 | 4/1971 | Laverdant | 188/106 F X |
| 3,643,763 | 2/1972 | Hay | 188/196 A X |
| 3,783,981 | 1/1974 | Burgdorf | 188/106 F |
| 4,306,635 | 12/1981 | Mitchell | 188/370 X |
| 4,471,614 | 9/1984 | Hart | 60/593 X |
| 4,487,295 | 12/1984 | Mitchell | 188/106 F X |
| 4,494,631 | 1/1985 | Billeter | 188/196 A X |
| 4,496,033 | 1/1985 | Hall et al. | 92/63 X |

FOREIGN PATENT DOCUMENTS 1198443  7/1970  United Kingdom ............... 188/72.6

Primary Examiner—Douglas C. Butler
Attorney, Agent, or Firm—D. D. McGraw

[57] ABSTRACT

A disc brake has a hydraulic parking brake actuator. A parking brake piston is advanced upon actuation to close a parking brake valve, sealing hydraulic fluid in the service pressure actuating chamber. Further advancing movement of the parking brake piston generates hydraulic pressure in the actuating chamber and engages the brake. Increased pressure in the actuating chamber also increases the sealing force on the valve controlling the sealing of the pressure chamber. The parking brake mode may also be obtained while hydraulic service brake pressure exists in the actuating chamber by moving the parking brake piston sufficiently to close the parking brake valve, trapping pressurized hydraulic fluid in the actuating chamber and holding the brake in the actuated condition. This pressure may be further increased, if desirable, by further advancing movement of the parking brake piston to further increase the pressure.

2 Claims, 1 Drawing Figure

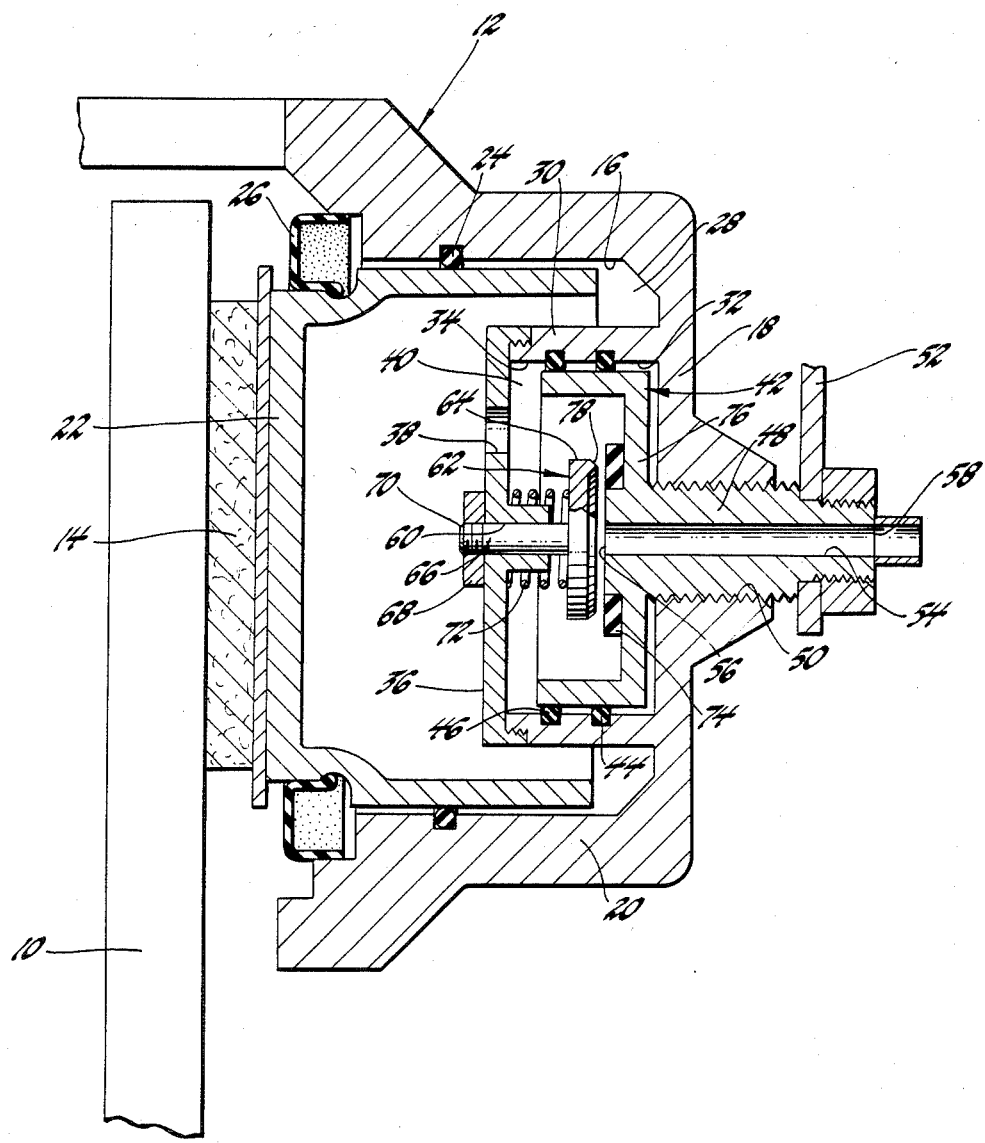

HYDRAULIC PARKING BRAKE

The invention relates to a hydraulically actuated brake for service braking in which a parking brake mechanism is also actuated by hydraulic pressure. The preferred embodiment disclosed herein shows a disc brake with the parking brake mechanism embodying the invention. The pressurizing chamber of the disc brake cylinder is provided with a parking brake actuating piston which is moved to close a parking brake valve, sealing hydraulic fluid within the cylinder. Further actuation of the parking brake piston advances the brake service actuation piston to engage the brake in a parking brake mode. The parking brake mode may also be obtained when the brake has been actuated for service braking and brake pressure is already present in the actuating chamber. In this instance, the parking brake piston is advanced to close the parking brake valve, and the service brake pressure is then released. The parking brake piston and valve will retain the brake pressure in the actuating chamber and hold the brake in the actuated condition. If additional parking brake force is required, the parking brake piston is advanced further to increase the hydraulic fluid pressure in the actuating chamber and therefore increase the parking brake action of the brake system.

IN THE DRAWING

The single FIGURE is a cross-section view of a schematic representation of a disc brake caliper assembly embodying the invention, with parts broken away and in section.

The disc brake illustrated in the drawing includes a disc 10 to be braked and a caliper 12 to provide the braking force. One brake pad assembly 14 is illustrated as being movable to engage one side of the disc 10 in friction braking relation. It is to be understood that in the typical brake arrangement another brake pad assembly, not shown, is provided to engage the other side of the disc 10 in friction braking relation. Caliper 12 has one side thereof formed to provide a cylinder 16 therein defined by a cylinder end wall 18 and a cylinder side wall 20. Cylinder 16 is open toward the disc 10. A cup-shaped actuating piston 22 is sealingly and reciprocably received in cylinder 16 and engages the brake pad assembly 14 for brake actuation as above described. A suitable piston seal 24 is provided, as is a suitable boot seal 26. Piston 22 and cylinder 16 cooperate to form the hydraulic pressure actuating chamber 28 which extends into the interior of piston 22 as well as in cylinder 16. The cylinder end wall 18 has an annular wall 30 extending therefrom into cylinder 16 and partially into the interior of piston 22. Wall 30 has an inner cylindrical surface 32 and forms a parking brake cylinder 34 which opens into the pressure chamber 28. A cap 36 is provided over the open end of wall 30 and has an opening 38 therethrough to provide continuous fluid communication between hydraulic actuating pressure chamber 28 and the parking brake chamber 40 formed by the parking brake cylinder 34. A parking brake piston 42 is reciprocably and rotatably received in the parking brake chamber 40 and is in sealing relation with the parking brake cylinder 34 by means of seals 44 and 46 provided in suitable grooves in the inner cylindrical surface 32. Piston 42 has an externally threaded shaft 48 extending outwardly therefrom through a threaded opening 50 formed in end wall 18, the threads of shaft 48 and opening 50 being in threaded mating relation so that rotation of shaft 48 relative to end wall 18 will result in axial as well as rotational movements of the shaft and piston 42. The portion of shaft 48 extending outwardly beyond end wall 18 has a parking brake actuating lever 52 secured thereto by means of which rotation of shaft 48 may be obtained in a manner known in the art. A passage 54 extends axially through shaft 48 and piston 42, with its inner open end 56 opening into chamber 40. Its outer open end 58 has means for connecting a brake hose thereto to conduct hydraulic brake actuating fluid from and to a master cylinder to actuate and release the brake actuating piston 22 for service braking. The brake hose to be connected to the outer end of shaft 48 must be sufficiently torsionally flexible to permit rotation of the shaft throughout its normal range of movement, or a suitable relatively rotatable hydraulic fitting must be provided.

Cap 36 has a passage 60 extending axially therethrough in alignment with the axis of shaft 48 and passage 54. A parking brake valve member 62 is positioned within chamber 40 axially intermediate passage open end 56 and passage 60. The valve member has a head portion 64 and a stem 66. The stem extends axially through the passage 60 and has a suitable arrangment such as a threaded nut 68 attached to its outer end 70 which holds the valve member 62 in position on cap 36. A valve spring 72 extends about stem 66 and a boss-like portion of cap 36 through which passage 60 extends and engages the valve head 64 so as to continually urge the valve axially toward the inner end of shaft 48 and the center portion of parking brake piston 42. Spring 72 also permits axial movement of valve member 62 with piston 42 as needed during parking brake actuation. A rubber-like valve seat 74 is annularly formed and mounted on the inner end of shaft 48 so that it is also backed up by the end wall 76 of piston 42. Valve head 64 has an annular lip 78 in axial alignment with valve seat 74 and arranged to be in sealing engagement therewith when the valve seat is moved axially until it contacts valve head 64.

The mechanism is illustrated in brake released position. When it is desired to actuate the mechanism for service braking, pressurized hydraulic fluid is conducted to passage 54 and passes through passage open end 56 and past valve member 62 and valve seat 74 into chamber 40. It passes out of chamber 40 through opening 38 into chamber 28 and acts on piston 22 to move that piston toward disc 10, moving brake pad assembly 14 into friction braking engagement with a side surface of the disc. In the typical sliding caliper arrangement, reaction of the fluid pressure in chamber 28 also moves caliper 12 to the right as seen in the drawing, engaging another brake pad assembly with the other side of disc 10 in friction braking relation, as is well known in the art. When pressure in the brake fluid in chamber 28 is released, piston 22 returns to the released position shown. In service brake actuation, there has been no movement of shaft 48, parking brake piston 42, or valve 62.

When the vehicle operator desires to operate the parking brake, he causes the parking brake actuating lever 52 to be arcuately moved and therefore causes shaft 48 to rotate in threaded passage 50, the threaded action causing the shaft to also move inwardly of cylinder 34 as seen in the drawing. It moves parking brake piston 42 with it and valve seat 74 engages the valve lip 78, closing passage open end 56 against fluid communication with chamber 40. This traps hydraulic fluid in chambers 40 and 28. Further arcuate movement of lever 52 causes piston 42 to move axially leftwardly while it is rotating with shaft 48, with valve member 62 moving with it, decreasing the effective volume of chamber 40 and therefore generating hydraulic pressure in that chamber as well as in chamber 28. This pressure acts on actuating piston 22, moving brake pad assembly 14 into friction braking engagement with disc 10 as before. It also acts on valve member 62, urging it more tightly into sealing engagement with valve seat 74. So long as the actuating lever 52 is held in the arcuately moved position, the hydraulic pressure will be retained in the chambers 28 and 40 and the parking brake mechanism, will be held in actuated mode. When the vehicle operator desires to release the parking brake mechanism he causes the parking brake actuating lever 52 to be arcuately moved in the opposite direction, moving parking brake piston 42 rightwardly as seen in the drawing and reducing the hydraulic pressure in chambers 40 and 28. When moved sufficiently rightwardly, valve seat 74 moves away from valve lip 78 due to the limiting action set by the length of valve stem 66 and nut 68, and the hydraulic fluid pressure, if any, remaining in chambers 28 and 40 is readily relieved past the valve through passage 54.

The parking brake may also be actuated while the service brake mechanism is energized. With hydraulic brake pressure contained in chambers 28 and 40 during service brake actuation, the parking brake actuating lever 52 may be moved arcuately until valve seat 74 engages valve lip 78 and the fluid connection between passage 54 and chamber 40 is closed. The master cylinder generating the service braking pressure may then be released and the pressure in chambers 28 and 40 will be trapped therein, holding piston 22 in the brake actuating condition for parking brake purposes. If the vehicle operator desires additional parking brake force, he may cause actuating lever 52 to be further rotated in the brake actuation direction, causing parking brake piston 42 to move axially and further pressurize the brake fluid in chambers 28 and 40. This will cause piston 22 to transmit additional braking force to the disc 10 through the brake pad assembly 14, and the caliper 12 to do likewise with the opposite brake pad assembly, increasing the braking force in the parking brake mode. The parking brake mode is released as before, with the actuating lever 52 being moved in the opposite direction to move shaft 48 and valve seat 74 away from valve 62 and release the hydraulic fluid pressure in chambers 28 and 40, as well as moving the parking brake piston 42 rearwardly to increase the effective volume of chamber 40 and therefore decrease the pressure contained therein if additional pressure has been generated by it.

The embodiments of the invention in which an exclusive property or privilege is claimed are defined as follows:

1. In a hydraulic pressure actuated wheel brake cylinder for disc brakes and the like, a hydraulic parking brake actuator comprising:
   a housing having an actuating cylinder formed therein and having an end wall and a cylinder side wall;
   a cup-shaped brake actuating piston reciprocably received in said cylinder and forming therewith a hydraulic pressure chamber in said cylinder and said piston;
   a parking brake cylinder formed in said housing within said actuating cylinder and extending from said end wall and opening into said pressure chamber, a parking brake chamber being formed by said parking brake cylinder, said parking brake cylinder having a cap thereon separating said parking brake chamber from said pressure chamber and having an opening therein providing fluid communication between said chambers;
   a parking brake piston reciprocably and rotatably received in said parking brake chamber and in sealing relation with said parking brake cylinder, said parking brake piston having a threaded shaft thereon and said end wall having a threaded opening therein through which said threaded shaft extends in threaded relation, a parking brake actuating lever secured to said shaft on the other side of said end wall from said parking brake chamber, said shaft and said parking brake piston having a passage formed therethrough with one end opening into said parking brake chamber and the other end having means for connecting a brake hose thereto to conduct hydraulic brake actuating fluid from and to a master cylinder to actuate and release the brake actuating piston for service braking;
   an annular valve seat on said parking brake piston surrounding said passage one end;
   a valve member reciprocably mounted on said cap and aligned for sealing engagement with said valve seat to selectively close said passage against fluid communication with said parking brake chamber, said valve member having spring means continuously urging it toward said valve seat and means limiting movement of said valve member toward said valve seat so that in the parking brake released position said valve is spaced from said valve seat to permit hydraulic fluid flow therepast;
   said parking brake piston being actuated by rotational movement of said shaft and moved axially by action of the threads to engage said valve seat with said valve member to trap hydraulic fluid in said chambers and with further movement to pressurize hydraulic fluid in said chambers and move said actuating piston to actuate said brake in a parking brake mode, and being released by opposite rotational movement of said shaft to release the hydraulic fluid pressure in said chambers and reopen said valve seat relative to said valve member.

2. In a hydraulic pressure actuated wheel brake cylinder for disc brakes and the like, a hydraulic parking brake actuator comprising:
   a housing having an actuating cylinder formed therein and having an end wall and a cylinder side wall;
   a cup-shaped brake actuating piston reciprocably received in said cylinder and forming therewith a hydraulic pressure chamber in said cylinder and said piston;
   a parking brake cylinder formed in said housing within said actuating cylinder and extending from said end wall and opening into said pressure chamber, a parking brake chamber being formed by said parking brake cylinder, said parking brake cylinder having a cap thereon separating said parking brake chamber from said pressure chamber and having an opening therein providing fluid communication between said chambers;

a parking brake piston reciprocably and rotatably received in said parking brake chamber and in sealing relation with said parking brake cylinder, said parking brake piston having a threaded shaft thereon and said end wall having a threaded opening therein through which said threaded shaft extends in threaded relation, a parking brake actuating lever secured to said shaft on the other side of said end wall from said parking brake chamber, said shaft and said parking brake piston having a passage formed therethrough with one end opening into said parking brake chamber and the other end having means for connecting a brake hose thereto to conduct hydraulic brake actuating fluid from and to a master cylinder to actuate and release the brake actuating piston for service braking;

an annular valve seat on said parking brake piston surrounding said passage one end;

a valve member reciprocably mounted on said cap and aligned for sealing engagement with said valve seat to selectively close said passage against fluid communication with said parking brake chamber, said valve member having spring means continuously urging it toward said valve seat and means limiting movement of said valve member toward said valve seat so that in the parking brake released position said valve is spaced from said valve seat to permit hydraulic fluid flow therepast;

said actuating piston being actuated by pressurized hydraulic fluid delivered through said passage to said chambers to move said actuating piston and actuate the brake for service braking;

said parking brake piston being actuated by rotational movement of said shaft and moved axially by action of the threads to engage said valve seat with said valve member to trap hydraulic fluid in said chambers, such actuation trapping pressurized hydraulic fluid in said chambers to maintain the brake actuated in a parking brake mode when said actuating piston is actuated in the service braking mode, and by further rotational movement of said shaft being further moved in the actuating direction to pressurize hydraulic fluid in said chambers to actuate said actuating piston in the parking brake mode when said actuating piston is not already pressure actuated in the service braking mode.

* * * * *